(12) United States Patent
Mine

(10) Patent No.: US 9,568,958 B2
(45) Date of Patent: Feb. 14, 2017

(54) INFORMATION PROCESSING APPARATUS, ICON SELECTION METHOD, AND PROGRAM

(75) Inventor: Aramu Mine, Minato-ku (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 13/295,821

(22) Filed: Nov. 14, 2011

(65) Prior Publication Data

US 2012/0151412 A1    Jun. 14, 2012

(30) Foreign Application Priority Data

Dec. 9, 2010    (JP) .................................. 2010-274990

(51) Int. Cl.
| | | |
|---|---|---|
| G06F 3/0482 | (2013.01) | |
| G06F 3/0481 | (2013.01) | |
| G06F 1/16 | (2006.01) | |
| G06F 3/0488 | (2013.01) | |
| G06F 3/0489 | (2013.01) | |

(52) U.S. Cl.
CPC ........... *G06F 1/169* (2013.01); *G06F 3/04817* (2013.01); *G06F 3/04886* (2013.01); *G06F 3/04892* (2013.01)

(58) Field of Classification Search
None
See application file for complete search history.

(56) References Cited

U.S. PATENT DOCUMENTS

| | | | | |
|---|---|---|---|---|
| 7,728,823 | B2 * | 6/2010 | Lyon et al. ................... | 345/173 |
| 8,384,683 | B2 * | 2/2013 | Luo ............................... | 345/173 |
| 8,427,438 | B2 * | 4/2013 | Louch ........................... | 345/173 |
| 8,504,935 | B2 * | 8/2013 | Stallings et al. .............. | 715/778 |
| 2004/0004604 | A1 * | 1/2004 | Numano ........................ | 345/173 |
| 2004/0263491 | A1 * | 12/2004 | Ishigaki ........................ | 345/177 |
| 2005/0044508 | A1 * | 2/2005 | Stockton ....................... | 715/811 |
| 2005/0138575 | A1 * | 6/2005 | Hashimoto ........... | G06F 3/0481 |
| | | | | 715/815 |
| 2005/0235209 | A1 * | 10/2005 | Morita et al. ................. | 715/716 |
| 2008/0266289 | A1 * | 10/2008 | Park ...................... | G06F 3/0482 |
| | | | | 345/419 |
| 2010/0153884 | A1 * | 6/2010 | Chow et al. ................... | 715/841 |
| 2010/0162108 | A1 * | 6/2010 | Stallings et al. .............. | 715/702 |
| 2010/0245260 | A1 * | 9/2010 | Louch ............................ | 345/173 |
| 2010/0313136 | A1 * | 12/2010 | Yoshizawa et al. .......... | 715/739 |
| 2011/0061025 | A1 * | 3/2011 | Walline et al. ............... | 715/830 |
| 2011/0099524 | A1 * | 4/2011 | Jeong et al. .................. | 715/843 |

FOREIGN PATENT DOCUMENTS

JP    2003-233454    8/2003

* cited by examiner

*Primary Examiner* — Matt Kim
*Assistant Examiner* — Mahelet Shiberou
(74) *Attorney, Agent, or Firm* — Chip Law Group

(57) ABSTRACT

An information processing apparatus includes a display, a controller, and an operation unit. The controller is capable of collectively displaying a plurality of icons in a first area of the display. The operation unit includes a second area provided near the display to correspond to the first area and is capable of selecting an icon displayed in the first area by operating a position in the second area that corresponds to a position of the icon.

16 Claims, 9 Drawing Sheets

INFORMATION PROCESSING APPARATUS, ICON SELECTION METHOD, AND PROGRAM

BACKGROUND

The present disclosure relates to an information processing apparatus having a function called a launcher, for example, an icon selection method used in such a function, and a program used for the function.

A function called a launcher used in a PC (Personal Computer) or the like is configured to display a list of icons of application programs and files registered in advance so that a desired icon can be selected therefrom. In the case of a laptop PC, with use of, for example, a touchpad, icons are selected by moving a pointer on a screen to a position of a desired icon and then clicking a left button of the touchpad.

Along with the upsizing of PC screens in recent years, an area for displaying a list of icons is becoming larger. As the area becomes larger, a movement amount of a pointer used for selecting a desired icon also becomes larger, and thus the pointer may jump to a different position when moved or the pointer may be lost. Originally, in a general PC, a screen and an operation unit used for operating the screen, such as a touchpad, are separately provided. In addition, the operation to the operation unit for moving a pointer on the screen separated as described above is, so to say, a relative operation. Therefore, a user is not allowed to make an intuitive operation and makes an operation while constantly paying close attention to the pointer on the screen, which is a considerably troublesome operation. In such a case, the convenience of the log-awaited launcher becomes poor.

Japanese Patent Application Laid-open No. 2003-233454 (paragraphs [0017] to [0021], FIG. 4; hereinafter, referred to as Patent Document 1) discloses a PC in which a touchpad having an LCD (Liquid Crystal Display) is used for displaying a plurality of icons thereon so that a user can select a desired icon from the displayed icons by touching the icon with a finger.

SUMMARY

In the PC disclosed in Patent Document 1, the user has to move the line of sight from the screen to the touchpad, which adversely becomes a troublesome operation.

Further, in the PC disclosed in Patent Document 1, in addition to the LCD for a main display, another LCD has to be provided to the touchpad, which increases costs. In addition, it is obvious that viability of such a PC is extremely low in view of problems on the number of components, design, practical aspects, and the like.

In view of the circumstances as described above, it is desirable to provide an information processing apparatus, an icon selection method, and a program that are capable of performing an operation of collectively displaying icons in a predetermined area of a display and selecting a desired icon therefrom intuitively and with high operability, and achieving such an operation without adopting a special structure.

According to an embodiment of the present disclosure, there is provided an information processing apparatus including a display, a controller, and an operation unit.

The controller is capable of collectively displaying a plurality of icons in a first area of the display.

The operation unit includes a second area provided near the display to correspond to the first area and is capable of selecting an icon displayed in the first area by operating a position in the second area that corresponds to a position of the icon.

In the embodiment of the present disclosure, by the operation for the position in the second area near the display, the position corresponding to the position of the icon displayed in the first area of the display, an icon can be selected. The position of the icon displayed in the first area and the position for the operation of selecting that icon in the second area have an absolute position relationship, and in addition, those positions are close to each other, with the result that the operation of selecting an icon can be performed intuitively and with high operability. For example, a user can roughly grasp a position of the operation in the second area by the feeling of a hand while looking at the first area, and confirm and select a desired icon in the first area while continuously looking at the first area. Therefore, the operation of collectively displaying icons in a predetermined area of the display and selecting a desired icon therefrom can be performed intuitively and with excellent operability.

The phrase "near the display" refers to, for example, a position of the touchpad with respect to the display of the laptop PC. Alternatively, as a matter of course, the position may be closer to the display.

In the embodiment of the present disclosure, the operation as described above can be achieved without changing the hardware configuration of the information processing apparatus such as a PC in related art or without making a large change.

In the embodiment of the present disclosure, the operation unit may include a touchpad capable of detecting a position indicated within the second area and to which a click can be made by a press within the second area, and the controller may select the icon displayed in the first area when a position on the touchpad that corresponds to the position of the icon is indicated and clicked.

In the embodiment of the present disclosure, since a click button does not have to be provided at a different position, the user does not have to visually confirm the position of the click button and can confirm and select a desired icon in the first area while continuously looking at the first area. Further, since the click button becomes unnecessary, the number of components can be reduced.

In the embodiment of the present disclosure, the controller may collectively display icons of a first group in the first area of the display when a specific activation action (for example, 3-finger tap) is performed on the touchpad. The specific activation action refers to an operation that is not made on the touchpad usually.

In the embodiment of the present disclosure, the existing touchpad is used for collectively displaying and outputting icons of the first group by an operation of a 3-finger tap that is not made on the touchpad usually, with the result that a physical button for activating a launcher does not have to be provided additionally.

In the embodiment of the present disclosure, the controller may change display of the first area of the display from the icons of the first group to icons of a second group when the touchpad is flicked.

In the embodiment of the present disclosure, by the page break processing by a flick, icons of another group can be displayed.

According to another embodiment of the present disclosure, there is provided an icon selection method including collectively displaying a plurality of icons in a first area and selecting, when a position in a second area corresponding to one of the icons is operated, the operated icon, the second area being provided near the first area to correspond to the first area.

In the embodiment of the present disclosure, the operation of collectively displaying icons in a predetermined area of the display and selecting a desired icon therefrom can be performed intuitively and with excellent operability. Further, in the embodiment of the present disclosure, the operation as described above can be achieved without changing the hardware configuration of the information processing apparatus such as a PC in related art or without making a large change.

According to still another embodiment of the present disclosure, there is provided a program causing an information processing apparatus to execute a display step and a selection step. In the display step, a plurality of icons are collectively displayed in a first area of a display. In the selection step, when a position in a second area corresponding to one of the icons is operated, the operated icon is selected, the second area being provided to correspond to the first area in an operation unit near the display.

In the embodiment of the present disclosure, the operation of collectively displaying icons in a predetermined area of the display and selecting a desired icon therefrom can be performed intuitively and with excellent operability. Further, in the embodiment of the present disclosure, the operation of collectively displaying icons in a predetermined area of the display and selecting a desired icon therefrom can be performed intuitively and with excellent operability without changing the hardware configuration of the information processing apparatus such as a PC in related art or without making a large change.

As described above, according to the embodiments of the present disclosure, it is possible to perform the operation of collectively displaying icons in a predetermined area of a display and selecting a desired icon therefrom intuitively and with high operability without changing a hardware configuration or without making a large change.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present disclosure will be described with reference to the drawings.

[Configuration of PC]

Figure 1:
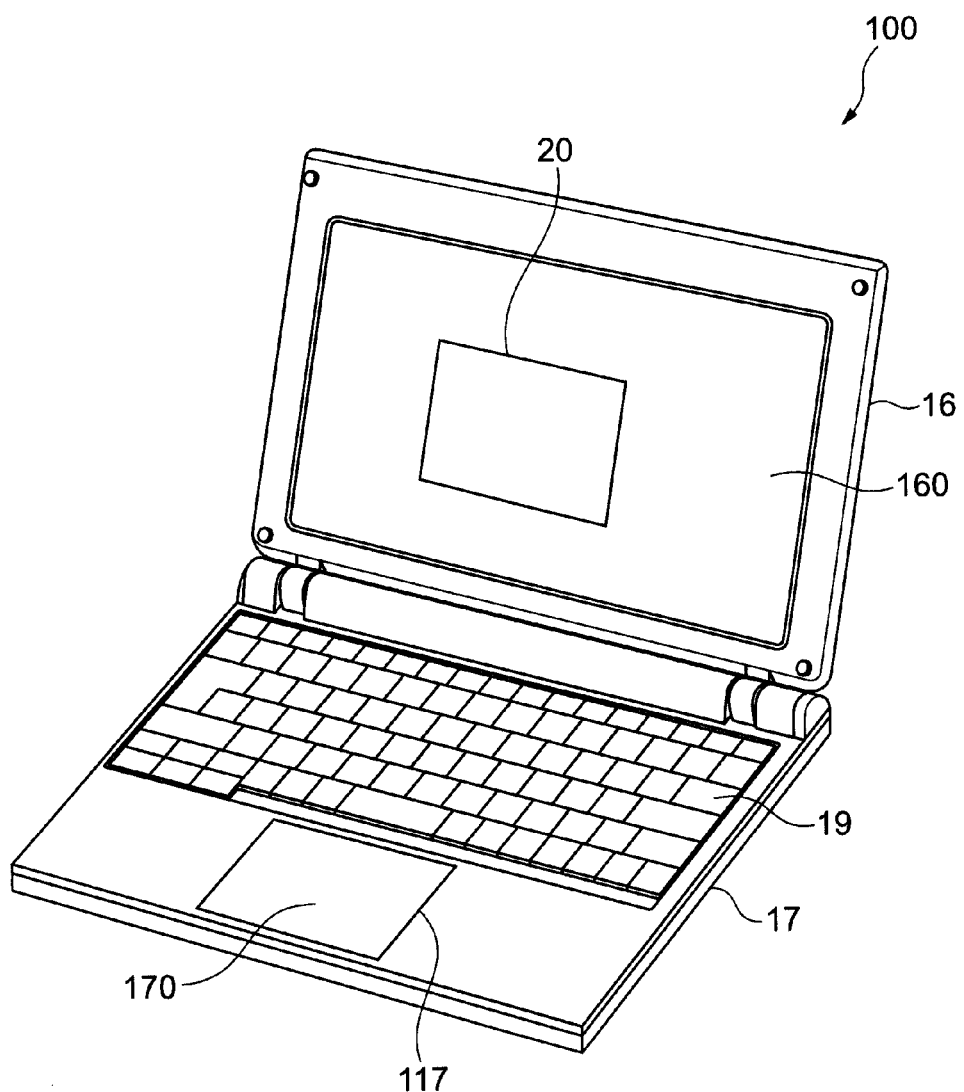
FIG. 1 is a perspective view of a PC (Personal Computer) according to an embodiment of the present disclosure.
Figure 2:
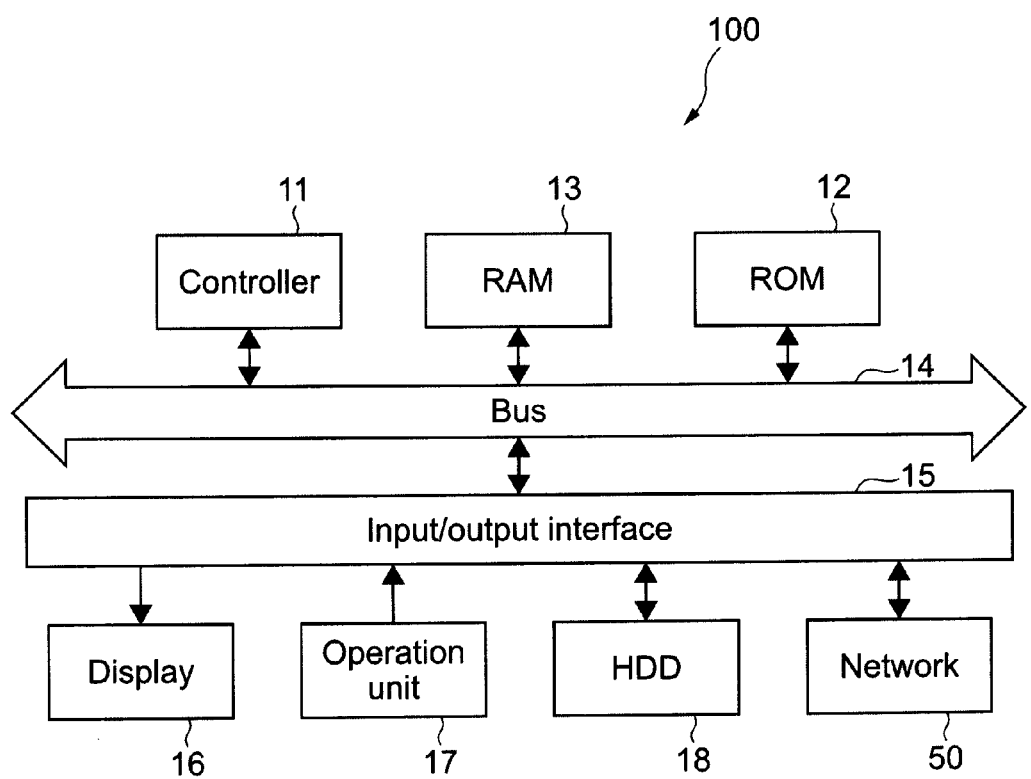
FIG. 2 is a diagram showing a hardware configuration of the PC according to the embodiment of the present disclosure.
Figure 3:
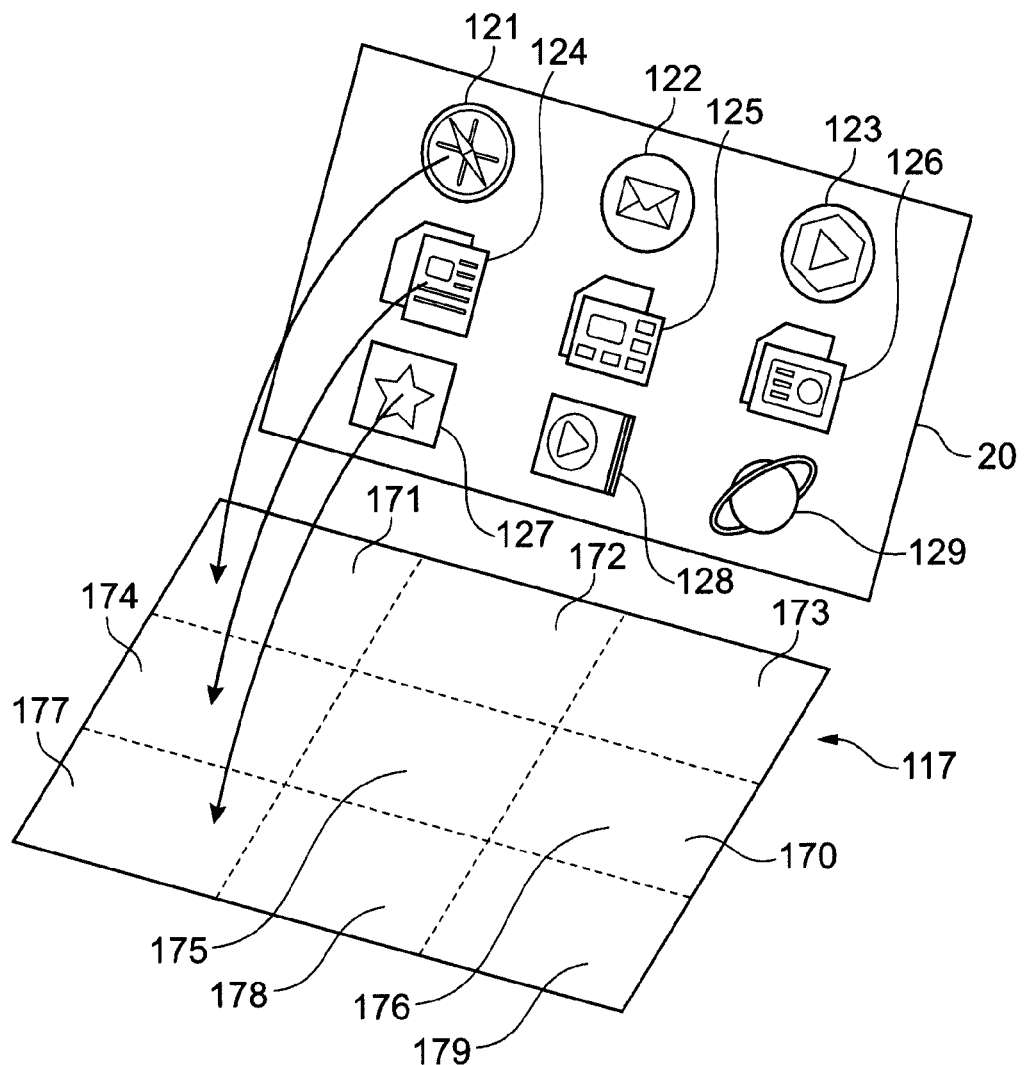
FIG. 3 is a diagram showing a correspondence relationship between a GUI of a launcher on a PC screen and a touchpad when the launcher of the PC according to the embodiment of the present disclosure is used.

FIG. 1 is a perspective view showing an outer appearance of a PC (Personal Computer) as an information processing apparatus according to an embodiment of the present disclosure. FIG. 2 is a diagram showing a hardware configuration of the PC. FIG. 3 is a diagram showing a correspondence relationship between a GUI of a launcher on a PC screen and a touchpad when the launcher of the PC is used.

As shown in FIG. 1, a PC 100 is a laptop personal computer and includes a display 16 and an operation unit 17.

The display 16 is a display device that uses, for example, liquid crystal or EL (Electro-Luminescence), and has a display area 160. In a first area 20 as a partial area of the display area 160 having a rectangular shape, for example, a GUI (Graphical User Interface) of a launcher that collectively displays a plurality of icons can be displayed.

The operation unit 17 includes a keyboard 19 and a touchpad 117 on the top surface thereof. The touchpad 117 has a second area 170 provided near the display area 160 so as to correspond to the first area 20. The second area 170 is an area in which an input operation can be made on the touchpad 117, and is substantially the entire area of the touchpad 117. The touchpad 117 detects a position of a user's finger touching it, but the position may be detected even when the finger is positioned slightly above the touchpad 117 and is not touching the touchpad 117.

The touchpad 117 has a pointing device function of moving a cursor displayed on the display area 160. The touchpad 117 also has a launcher operation function of selecting an icon on a GUI displayed in the first area 20 of the display area 160. The second area 170 of the touchpad 117 has, for example, a rectangular shape that is substantially of the same size and shape as that of the first area 20 serving as an area on which the GUI is displayed. In the case where the first area 20 and the second area 170 are different from each other in size, it is preferable for the first area 20 and the second area 170 to have a rectangular shape having the same aspect ratio.

The touchpad 117 enables multipoint detection in which a position indicated within the second area 170 can be detected to be performed, and the touchpad 117 itself is a clickable button. By the press on the second area 170 of the touchpad 117, it is determined that the entire touchpad 117 has been pressed down and clicked. In other words, although two right and left click buttons are generally provided on the front side of a touchpad, the touchpad according to this embodiment does not have two right and left click buttons, and the single touchpad functions as both a touchpad and a click button.

As shown in FIG. 2, the PC 100 includes a controller 11 including a CPU (Central Processing Unit), a ROM (Read Only Memory) 12, a RAM (Random Access Memory) 13, an input/output interface 15, and a bus 14 that connects those components to one another.

The controller 11 accesses the RAM 13 or the like when necessary and performs overall control of all the blocks of the PC 100 while performing various types of computation processing. The ROM 12 is a nonvolatile memory in which an OS to be executed by the controller 11 and firmware including a program and various parameters are fixedly stored. The RAM 13 is used as a work area or the like of the controller 11 and temporarily stores the OS, various applications in execution, and various pieces of data being processed.

To the input/output interface 15, the display 16, the operation unit 17, an HDD 18 as a storage, a network 50, and the like are connected.

In the HDD 18, the OS, various application programs, or various pieces of data are stored.

As described above, in this embodiment, the touchpad 117 has the launcher operation function of operating an icon within the GUI displayed in the first area 20, in addition to the pointing device function of moving the cursor on the display area 160.

When the launcher is activated, in the first area 20 of the display area 160 of the display 16, nine icons 121 to 129 in total (for example, 3×3 icons in a lengthwise direction and a crosswise direction) are displayed as shown in FIG. 3. Along with the activation of the launcher, the touchpad 117 switches functions from the pointing device function to the launcher operation function. In the launcher operation function, positions in the second area 170, which correspond to the positions of the icons 121 to 129 displayed in the first area 20, are operated so that the icons 121 to 129 can be selected.

Here, as shown in FIG. 3, similar to the number of icons displayed in the first area 20, the second area 170 is divided into nine touchpad areas 171 to 179 of 3×3 areas in a lengthwise direction and a crosswise direction. In other words, the first area 20 in which the launcher is displayed is substantially divided into nine areas in accordance with the respective icons, and the second area 170 in the touchpad 117 is also substantially divided into nine areas. The divided areas in the first area 20 have substantially the same shape and size as the divided areas in the second area 170, and each divided area in the first area 20 and each divided area in the second area 170 that are positioned at the same position have a correspondence relationship.

Therefore, in the case where the first icon 121 is to be selected, the finger is positioned in the first touchpad area 171 of the second area 170, which corresponds to the position of the first icon 121. Accordingly, the first icon 121 is selected, and with the finger pressing down the first touchpad area 171, an application program or a file corresponding to the first icon 121 can be determined and activated.

Similarly, the finger is positioned in the second touchpad area 172 when the second icon 122 is to be selected, in the third touchpad area 173 when the third icon 123 is to be selected, in the fourth touchpad area 174 when the fourth icon 124 is to be selected, in the fifth touchpad area 175 when the fifth icon 125 is to be selected, in the sixth touchpad area 176 when the sixth icon 126 is to be selected, in the seventh touchpad area 177 when the seventh icon 127 is to be selected, in the eighth touchpad area 178 when the eighth icon 128 is to be selected, and in the ninth touchpad area 179 when the ninth icon 129 is to be selected, to thereby select an icon and determine and activate an application program or a file corresponding to each icon with the pressing down of each touchpad area with a finger.

[Operation of Launcher of PC]

Next, the operation of the launcher of the PC 100 structured as described above will be described.

Figure 4:
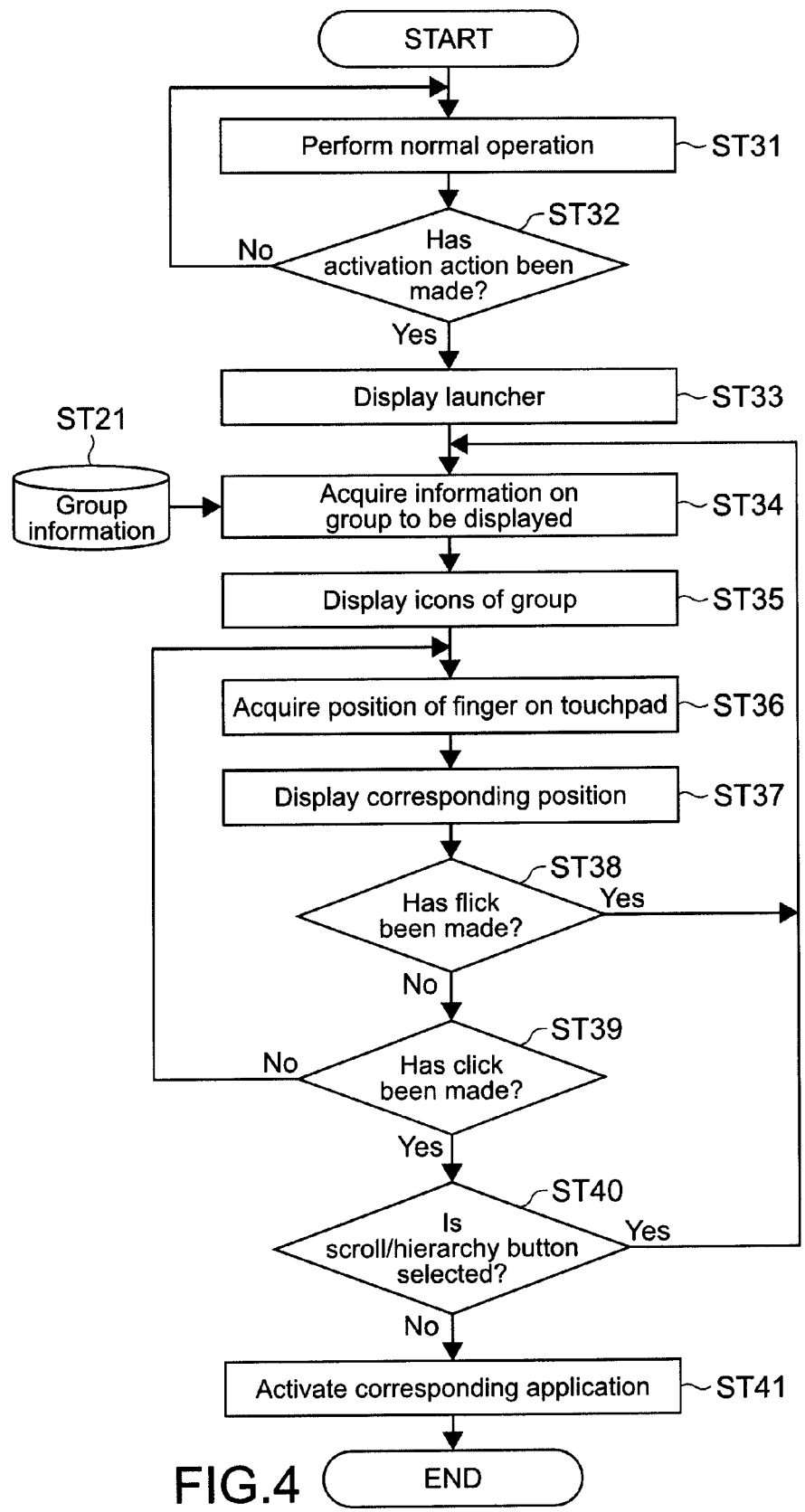
FIG. 4 is a flowchart for explaining the operation of the launcher by the PC according to the embodiment of the present disclosure.
Figure 5:
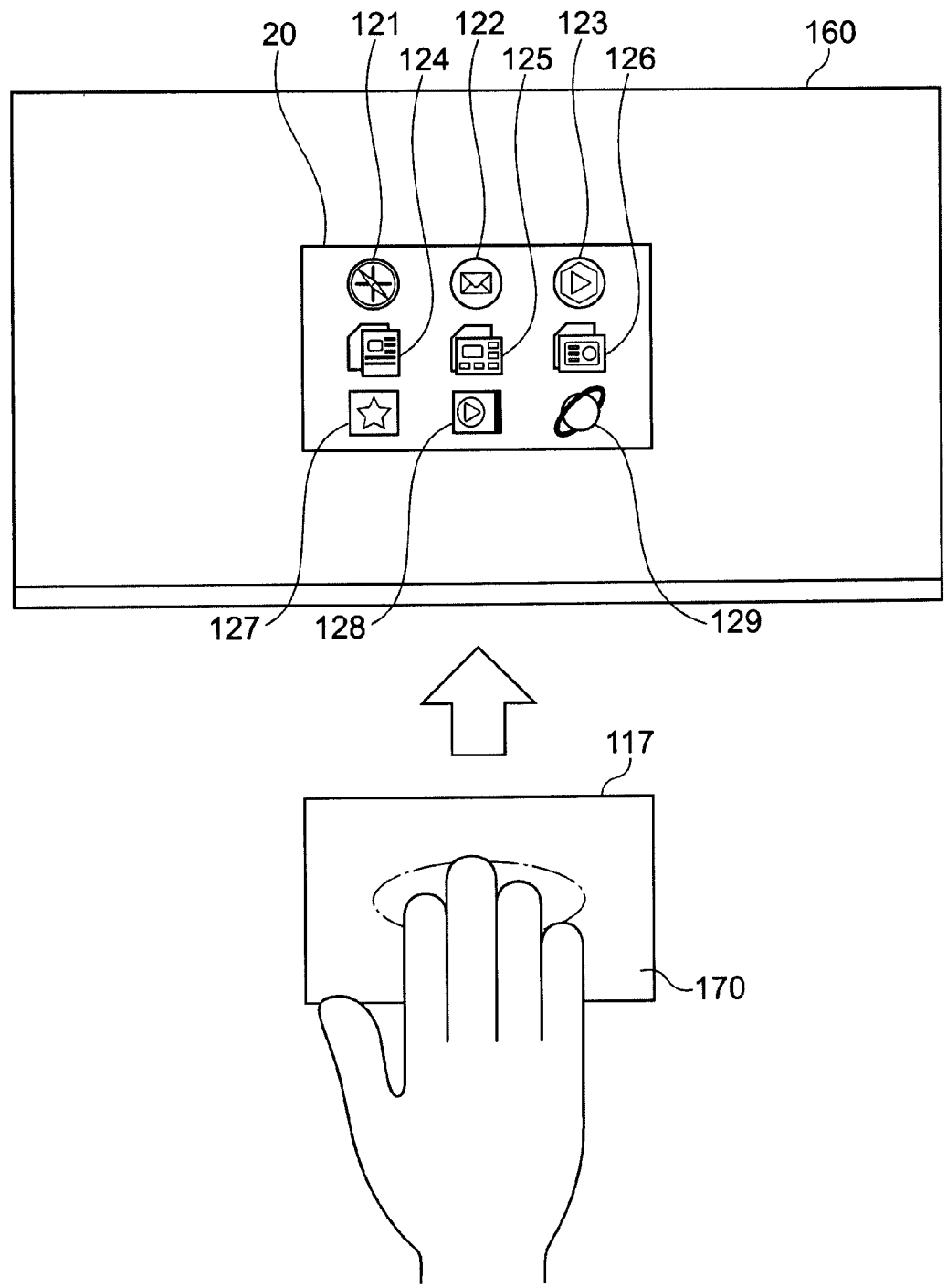
FIG. 5 is a diagram showing a method of activating the launcher of the PC and the PC screen at the time of activation according to the embodiment of the present disclosure.
Figure 6:
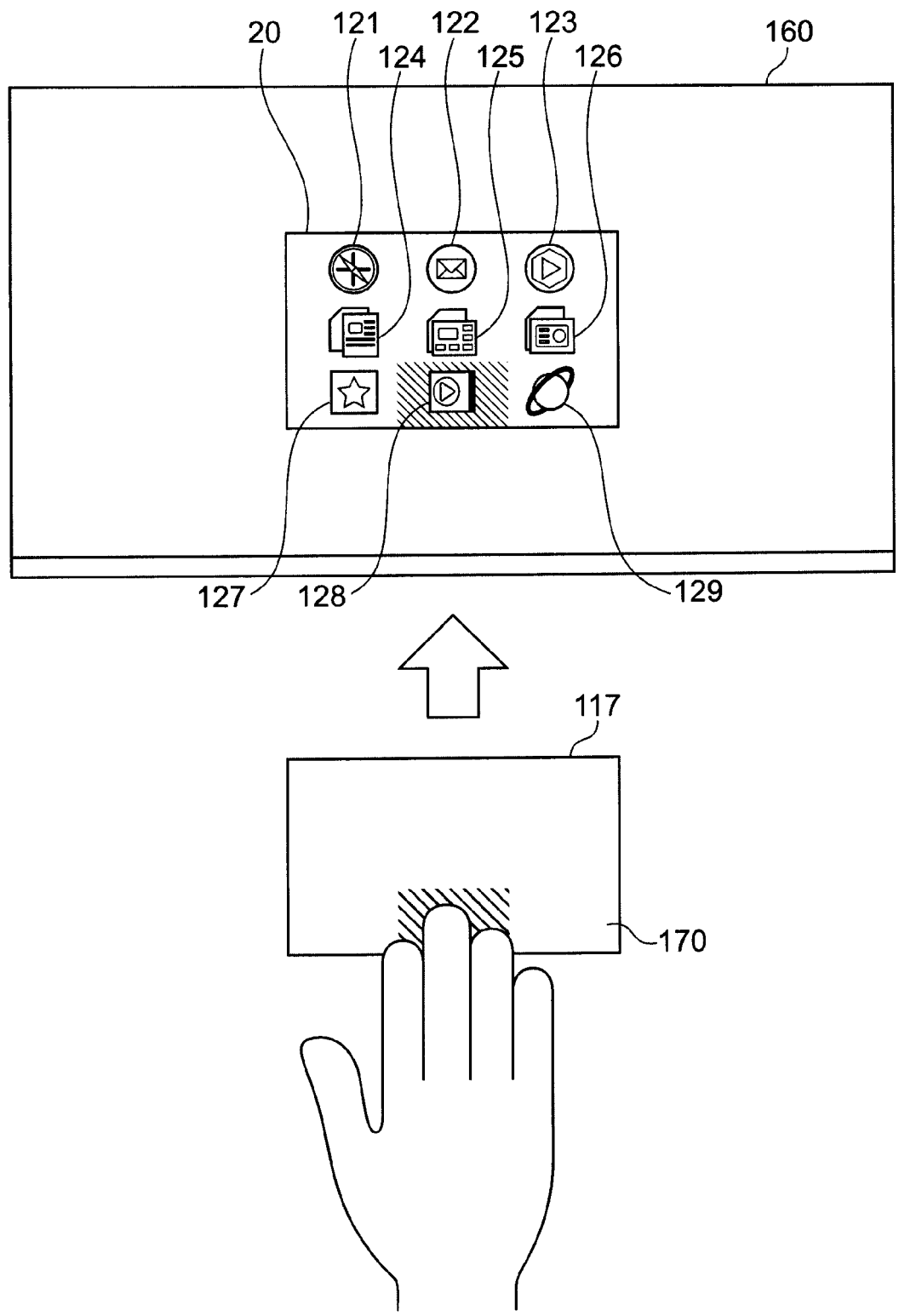
FIG. 6 is a diagram showing the PC screen and an operating state of the touchpad at the time of selection of an icon of the launcher of the PC according to the embodiment of the present disclosure.
Figure 7:
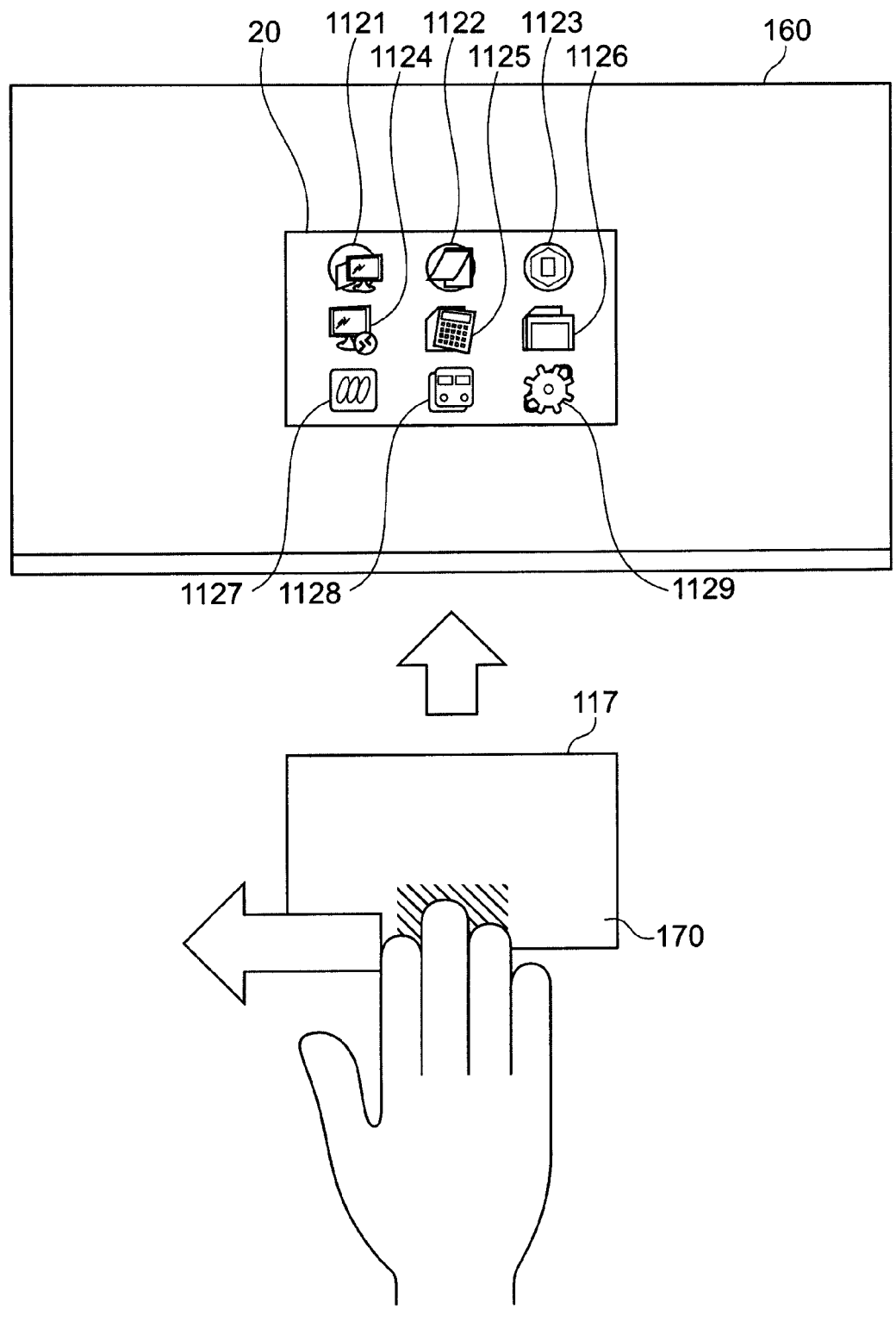
FIG. 7 is a diagram showing a page break method for the launcher of the PC according to the embodiment of the present disclosure.

FIG. 4 is a flowchart for explaining the operation of the launcher. FIGS. 5 to 7 are diagrams each showing the state of the touchpad and PC screen.

Hereinbelow, a description will be given with reference to FIG. 4, and when necessary, FIGS. 5 to 7.

In the start-up state of the PC 100, the launcher is not activated, and the touchpad 117 is under the pointing device function of moving a cursor displayed in the display area 160, which is a normal operation (Step 31).

Next, the controller 11 determines whether an activation action of, for example, a 3-finger tap has been made on the touchpad 117 as shown in FIG. 5 (Step 32).

When it is determined that an activation action has been made (Yes in Step 32), the launcher is activated. Specifically, the controller 11 displays a GUI of the launcher in the first area 20 of the display area 160 of the display 16 (Step 33). Further, the controller 11 switches the pointing device function of the touchpad 117 to the launcher operation function for selecting an icon in the GUI displayed in the first area 20 of the display area 160. It should be noted that when an activation action has not been made (No in Step 32), the operation under the pointing device function in the normal state (Step 31) is continued.

Subsequently, the controller 11 acquires information on a plurality of icons 121 to 129 of a first group registered in advance in the HDD 18, for example (Step 34). Based on the acquired information, the controller 11 collectively displays the plurality of icons 121 to 129 of the first group in the first area 20 of the display area 160 of the display 16 (Step 35).

In this state, a user can select a desired icon from the icons in the GUI displayed in the first area 20 of the display area 160, to thereby determine and activate an application program or a file corresponding to the icon.

The controller 11 detects and acquires the position of a finger on the touchpad 117 (Step 36), and displays on the display 16 an icon of the first area 20, which corresponds to the position of the finger placed on the touchpad 117, so that it can be recognized that the icon is being selected, based on the change of a color around the icon, for example (Step 37).

For example, as shown in FIG. 6, when the user places the fingers at the lower center portion of the second area 170 of the touchpad 117, the color around the icon 128 at a part of the first area 20 that corresponds to the position of the fingers is changed, and accordingly the user can recognize that the icon 128 is being selected. It should be noted that as a display method of determining the presence or absence of selection, in addition to the change in color, a change in size such as an increase in size of an icon may be possible, but the display method is not limited thereto.

Next, the controller 11 determines whether the touchpad 117 has been flicked (Step 38). When determining that the touchpad 117 has been flicked (Yes in Step 38), the controller 11 returns to Step 34 in order to acquire information on a plurality of icons 1121 to 1129 of a second group registered in advance in the HDD 18.

Then, as shown in FIG. 7, the controller 11 collectively displays the plurality of icons 1121 to 1129 of the second group in the first area 20 of the display area 160 of the display 16 (Step 35). When determining that the touchpad 117 has not been flicked (No in Step 38), the controller 11 proceeds to Step 39.

The controller 11 determines, in a state where icons of any of the groups are displayed in the first area 20 of the display area 160 of the display 16 and one of the icons is being selected, whether the touchpad 117 has been clicked (Step 39).

Upon click of the touchpad 117 in this state, the controller 11 determines whether the selected icon is a scroll/hierarchy button (Step 40). When the clicked icon is a scroll/hierarchy button (Yes in Step 40), the controller 11 returns to Step 34.

In the case where the selected icon is not a scroll/hierarchy button but an application program or a file (No in Step 40), the controller 11 activates the selected application program or file (Step 41).

It should be noted that when the display of the GUI of the launcher is desired to be hidden from the display area 160 of the display 16, for example, a function key of the keyboard 19 may be used, or an operation of a 3-finger tap on the touchpad 117, or the like may be performed.

[Operational Effect of PC According to Embodiment]

As described above, in the PC 100 of this embodiment, the divided areas in the first area 20 are substantially the same as the divided areas in the second area 170 in shape and size, as shown in FIG. 3. In addition, a divided area in the first area 20 has a correspondence relationship with a divided area in the second area 170 at the same position. In other words, the position of an icon displayed in the first area and the position of an operation performed in the second area to select the icon have an absolute position relationship. When the user touches a position of the touchpad 117 with the finger, the position corresponding to the position of a desired icon in the GUI displayed in the first area 20 of the display area 160 of the display 16, the icon is selected. When the user subsequently clicks the touchpad 117 with the finger, an application program or file corresponding to the icon is activated.

Accordingly, the user can roughly grasp an icon selection position on the touchpad 117 by the feeling of a hand while looking at the first area 20 of the display area 160 of the display 16, that is, without looking at the touchpad 117. Further, the user can confirm and select a desired icon while continuously looking at the first area 20, and subsequently activate an application program or file corresponding to the icon. Therefore, the selection of a desired icon from the GUI display of the launcher and the activation of an application program or file corresponding to the icon can be performed intuitively and with excellent operability.

Further, when an operation that is not made on the touchpad 117 usually, that is, a 3-finger tap is performed, for example, the launcher is activated, and then the plurality of icons of the first group are collectively displayed in the first area 20. Further, when the touchpad 117 is flicked at a time of activation of the launcher, the page break processing in which the display of icons of the first group is changed to the display of icons of the second group as another group can be performed.

Therefore, in the PC 100 according to this embodiment, the operation of the launcher can be achieved without changing the hardware configuration of the PC in related art or without making a large change.

Another Embodiment

In the embodiment described above, the touchpad is used as the second area for selecting and determining/activating an icon, but a keyboard may be used instead of the touchpad. For example, a capacitive sensor may be attached to at least an area of a keyboard that serves as the second area to perform position detection (icon selection), and when a button of the keyboard is pressed, the determination/activation may be performed. In other words, functions do not need to be assigned to the keys one by one. The activation and termination of the launcher in this case may be assigned to function keys (for example, "Fn"+"F1"), for example.

Further, the same function as the second area may be assigned to, for example, the buttons "Q", "W", "A", and "S" of the keyboard. In this case, a first area may be displayed in an area of a display that corresponds to "Q", "W", "A", and "S", and icons respectively corresponding to "Q", "W", "A", and "S" may be displayed in the first area. In the case of a laptop PC, since the width of the keyboard and that of the screen coincides with each other, a large launcher that uses a full width of the screen and has the same usability can be created.

Further, in the case where a flat keyboard is used for the keyboard of the PC, the second area may be set in the flat keyboard, which can be achieved if the same sensor used for a touch panel is mounted to the flat keyboard. Further, instead of a click, a press of a predetermined amount or more to the flat keyboard may be detected and assumed as an operation of a click (determination/activation).

In the embodiments described above, the first area 20 as an area in which the GUI is displayed has a rectangular shape that is substantially of the same size and shape as that of the second area 170 of the touchpad 117 (practically touchpad itself). However, when the resolution of a screen in the PC 100 is changed, the first area 20 and the second area 170 generally have a different size and shape. On the other hand, in the embodiments of the present disclosure, display control may be performed such that the first area 20 constantly has the same size and shape as the second area 170 even when the resolution of the screen in the PC 100 is changed. For example, in the case where the display of the PC is formed of liquid crystal, the display control may be caused to follow the size of the liquid crystal display and a changed resolution such that the first area 20 has the same size and shape as the second area (size of touchpad).

In the embodiments described above, icons displayed in the launcher are based on the information registered in advance in the HDD 18. However, in Windows (registered trademark), for example, programs at the head of a start menu or the like may be set as icons displayed in the launcher. In such a case, the programs at the head of the start menu or the like only need to be acquired from an operating system (OS). Further, recommendable programs in a descending order or the like selected from logs acquired by resident application programs or the like may be set as icons displayed in the launcher. Information of a recommendable application program may be acquired from a predetermined server via a network 50, and based on the information, an icon of the recommendable application program may be displayed at the head of the launcher.

Figure 8:
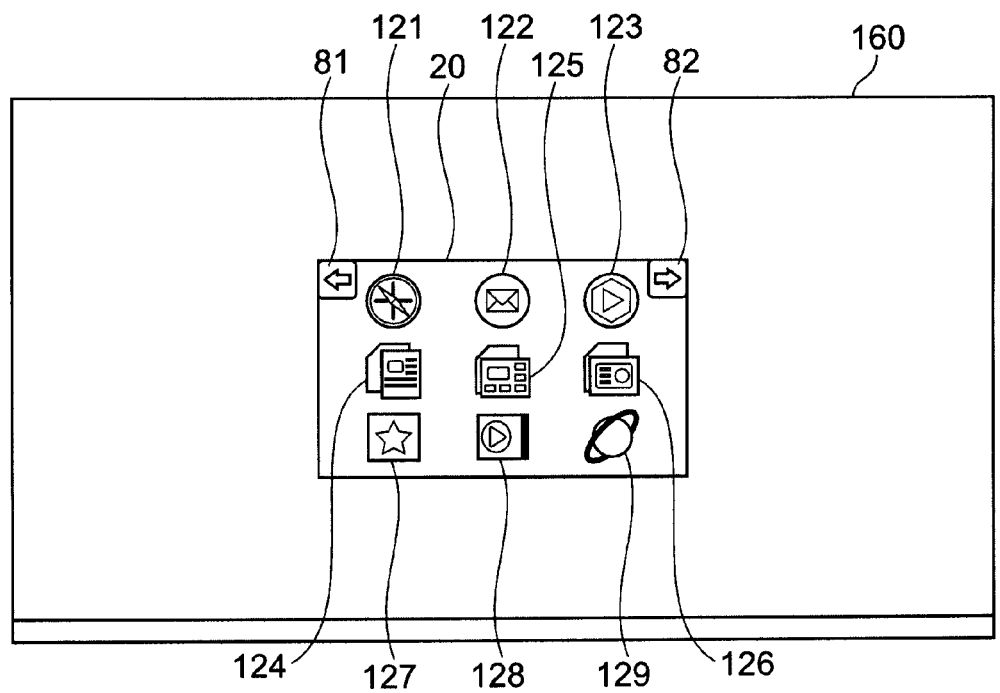
FIG. 8 is a diagram showing a GUI of the launcher on the PC screen according to another embodiment of the present disclosure.
Figure 9:
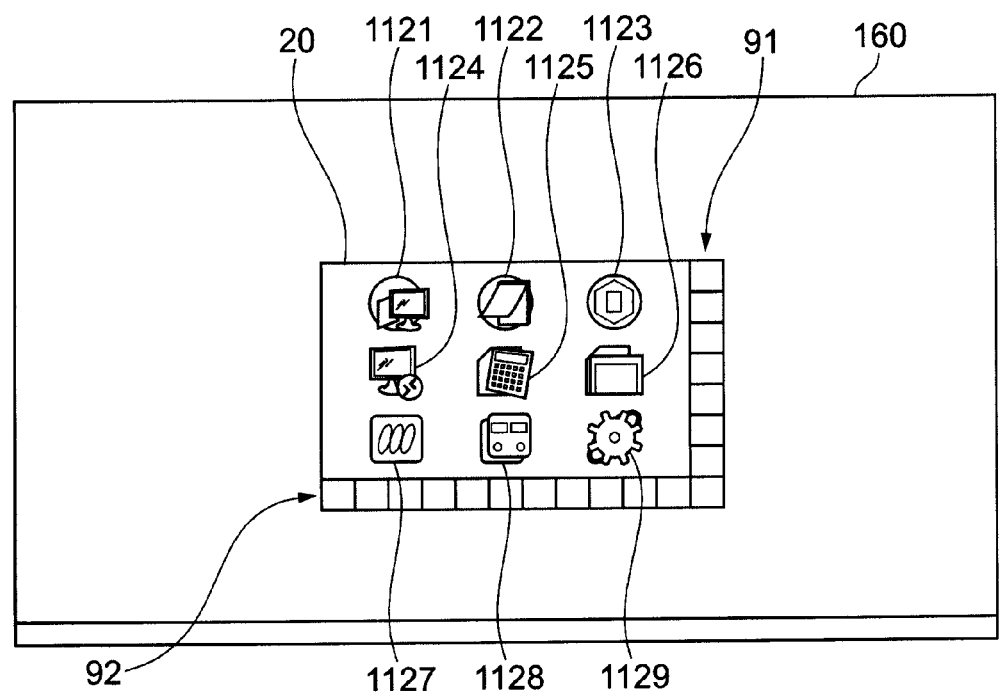
FIG. 9 is a diagram showing a GUI of the launcher on the PC screen according to still another embodiment of the present disclosure.

In the embodiments described above, in the operation of the launcher, the touchpad 117 is flicked so that the page break processing in which display of an icon of the first group is changed to display of an icon of the second group as another group is performed. However, the touchpad 117 may be flicked so that an icon displayed in the GUI of the launcher is scrolled. Further, instead of flick, as shown in FIG. 8, for example, scrolling may be performed by providing buttons 81 and 82 indicating "←" and "→" at both corners of an upper portion of the GUI of the launcher and selecting the buttons 81 and 82 (see Step 40 in FIG. 4). Further, as shown in FIG. 9, for example, a first button group 91 is provided along the right-side end of the GUI of the launcher, and a second button group 92 is provided along the lower-side end thereof. When any button of the first button group 91 is selected, the second button group 92 corresponding thereto is displayed. When any button of the second button group 92 is selected, an icon of a group corresponding thereto may be displayed in the GUI of the launcher (see Step 40 in FIG. 4).

In the embodiments described above, an application program or the like is activated based on an icon displayed in the GUI of the launcher, but each of the embodiments of the present disclosure may be used as a launcher of an application program that is being activated. For example, the function obtained when [Alt]-[Tab] buttons on Windows (registered trademark) are pressed may be assigned to the launcher. Such a launcher only needs to be activated by an operation different from the activation of the launcher in the normal state, such as a 4-finger tap.

Figure 10:
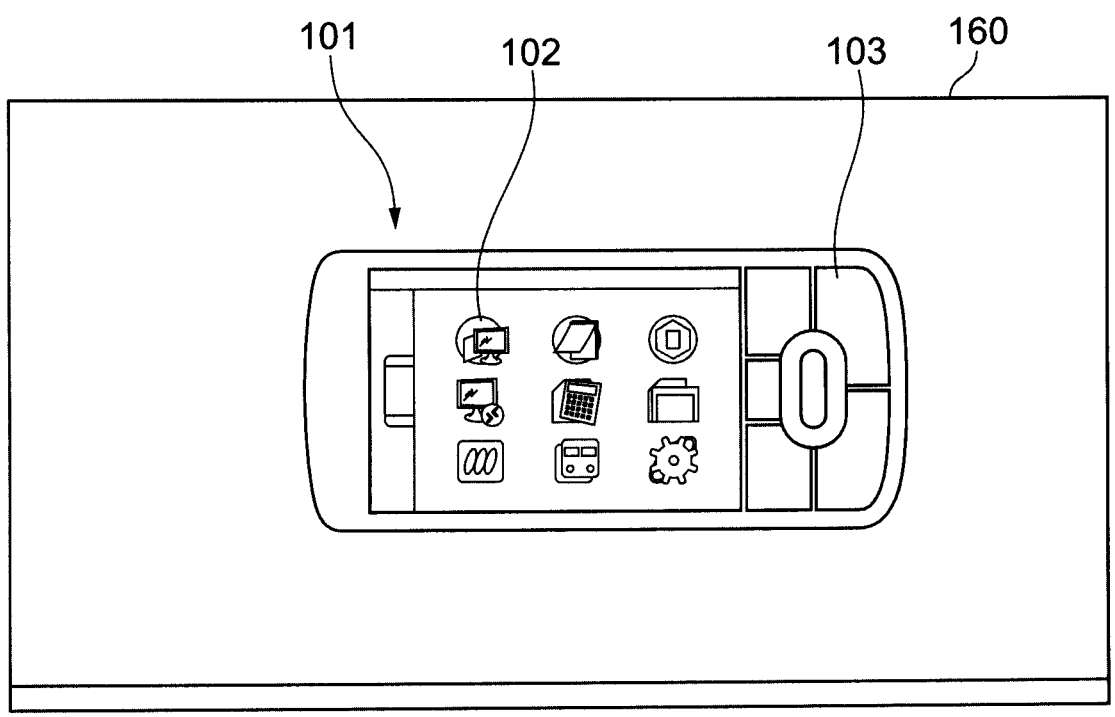
FIG. 10 is a diagram showing a GUI of the launcher on the PC screen according to still another embodiment of the present disclosure.

As shown in FIG. 10, when a mobile terminal is connected to the PC, the mobile terminal itself may be schematically displayed as a GUI of a launcher (reference numeral 101) to perform selection and determination/execution according to the embodiments of the present disclosure. For example, an icon 102 or an operation button 103 of the displayed mobile terminal 101 may be selected and determined/executed on a touchpad.

The present disclosure contains subject matter related to that disclosed in Japanese Priority Patent Application JP 2010-274990 filed in the Japan Patent Office on Dec. 9, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
    a display that includes a first area, and a second area and a third area within the first area;
    a touchpad that includes a fourth area that corresponds to the first area of the display, wherein the touchpad is configured to detect an input operation;
    a memory; and
    circuitry configured to:
        display, in an event the touchpad is in a pointing device mode, a cursor at a position in the first area of the display that corresponds to a position of the detected input operation in the fourth area of the touchpad;
        determine whether the detected input operation is an activation operation;
        activate a launcher operation to display, based on information of a first group acquired from the memory, a plurality of icons from the first group in a grid configuration in the first area of the display in an event the detected input operation is the activation operation;
        switch, in an event the detected operation is the activation operation, from the pointing device mode of the touchpad to a launcher operation mode in which the fourth area of the touchpad is divided into a plurality of touchpad areas that correspond to the plurality of icons displayed in the first area of the display;
        display a first group of buttons on the second area of the display along a first end of the first area of the display;
        determine whether the detected input operation is a click operation to select a first button from the first group of buttons;
        display a second group of buttons on the third area of the display along a second end of the first area of the display, wherein the second group of buttons correspond to the selected first button, selected by the click operation, from among the first group of buttons;
        display, on the first area of the display, the plurality of icons from a second group that corresponds to a second button selected by a click operation from among the second group of buttons; and
        activate, in an event the detected input operation is a click operation to select one of the plurality of icons, an application that corresponds to the selected icon in the position of the first area of the display that corresponds to the position of the detected input operation in the fourth area of the touchpad.

2. The information processing apparatus of claim 1, further comprising a scrolling button that, in response to activation by a user, is configured to scroll the display.

3. The information processing apparatus of claim 1, wherein the touchpad is further configured to detect the click operation to select the first button.

4. The information processing apparatus of claim 1, wherein the first area of the display is proportional to the fourth area of the touchpad.

5. The information processing apparatus of claim 1, wherein the first area of the display is of a same size as the fourth area of the touchpad.

6. The information processing apparatus of claim 1, wherein, in an event the touchpad is in the launcher operation mode, the circuitry is further configured to activate the application that corresponds to the selected icon that corresponds to an icon area in which the click operation is detected.

7. The information processing apparatus of claim 1, wherein the activation operation is a three-finger tap operation.

8. The information processing apparatus of claim 1, wherein the input operation further includes a finger hovered above the touchpad.

9. The information processing apparatus of claim 1, wherein the input operation is a touch operation.

10. The information processing apparatus of claim 1, wherein the circuitry is further configured to control the display to chance a color of an icon to display an icon selection.

11. The information processing apparatus of claim 1, wherein the circuitry is further configured to control the display to change a size of the icon to display an icon selection.

12. The information processing apparatus of claim 1, wherein the circuitry is further configured to:
    determine whether the detected input operation is a flick operation;
    acquire information of a third group that is registered in advance in the memory in an event the detected input operation is the flick operation; and
    change the first area of the display to display the plurality of icons from the third group, based on the information of the third group acquired from the memory, in the grid configuration in the first area of the display in an event the detected input operation is the flick operation.

13. The information processing apparatus of claim 1, wherein the circuitry is further configured to acquire information from a server via a network, in an event the detected input operation is the activation operation, with regard to an icon among the plurality of icons displayed on the first area that represents a recommended application stored in the memory.

14. The information processing apparatus of claim 1, wherein for each button of the first group of buttons selected by the click operation, a second group of buttons that corresponds to the first group of buttons are displayed on the third area of the display.

15. An icon selection method, comprising:
providing a first area for display, and a second area and a third area within the first area;
detecting an input operation in a fourth area of a touchpad that corresponds to the first area of a display;
displaying, in an event the touchpad is in a pointing device mode, a cursor at a position in the first area of the display that corresponds to a position of the detected input operation in the fourth area of the touchpad;
determining whether the detected input operation is an activation operation;
activating a launcher operation to display, based on information of a first group acquired from the memory, a plurality of icons from the first group in a grid configuration in the first area of the display in an event the detected input operation is the activation operation;
switching, in an event the detected operation is the activation operation, from the pointing device mode of the touchpad to a launcher operation mode in which the fourth area of the touchpad is divided into a plurality of touchpad areas that correspond to the plurality of icons displayed in the first area of the display;
displaying a first group of buttons on the second area of the display along a first end of the first area of the display;
determining whether the detected input operation is a click operation to select a first button from the first group of buttons;
displaying a second group of buttons on the third area of the display along a second end of the first area of the display, wherein the second group of buttons correspond to the selected first button, selected by the click operation, from among the first group of buttons;
displaying, on the first area of the display, the plurality of icons from a second group that corresponds to a second button selected by a click operation from among the second group of buttons; and
activating, in an event the detected input operation is a click operation to select one of the plurality of icons, an application corresponding to the selected icon in the position of the first area of the display that corresponds to the position of the detected input operation in the fourth area of the display.

16. A non-transitory computer-readable storage medium having stored thereon a set of computer-executable instructions which, when executed by an information processing apparatus, causes the information processing apparatus to execute operations, comprising:
providing a first area for display, and a second area and a third area within the first area;
detecting an input operation in a fourth area of a touchpad that corresponds to the first area of the display;
displaying, in an event the touchpad is in a pointing device mode, a cursor at a position in the first area of the display that corresponds to a position of the detected input operation in the fourth area of the touchpad;
determining whether the detected input operation is an activation operation;
activating a launcher operation to display, based on information of a first group acquired from the memory, a plurality of icons from the first group in a grid configuration in the first area of the display in an event the detected input operation is the activation operation;
switching, in an event the detected operation is the activation operation, from the pointing device mode of the touchpad to a launcher operation mode in which the fourth area of the touchpad is divided into a plurality of touchpad areas that correspond to the plurality of icons displayed in the first area of the display;
displaying a first group of buttons on the second area of the display along a first end of the first area of the display;
determining whether the detected input operation is a click operation to select a first button from the first group of buttons;
displaying a second group of buttons on the third area of the display along a second end of the first area of the display, wherein the second group of buttons correspond to the selected first button, selected by the click operation from among the first group of buttons;
displaying, on the first area of the display, the plurality of icons from a second group that corresponds to a second button selected by a click operation from among the second group of buttons; and
activating, in an event the detected input operation is a click operation to select one of the plurality of icons, an application corresponding to the selected icon in the position of the first area of the display that corresponds to the position of the detected input operation in the fourth area of the touchpad.

* * * * *